(No Model.)

O. MORRILL.
JUMP SEAT CARRIAGE.

No. 274,633. Patented Mar. 27, 1883.

Witnesses:
Harry E. Remick
Eugene Humphrey

Inventor:
Osgood Morrill
By Porter & Hutchinson
Attys

UNITED STATES PATENT OFFICE.

OSGOOD MORRILL, OF SALISBURY, MASSACHUSETTS.

JUMP-SEAT CARRIAGE.

SPECIFICATION forming part of Letters Patent No. 274,633, dated March 27, 1883.

Application filed November 11, 1882. (No model.)

*To all whom it may concern:*

Be it known that I, OSGOOD MORRILL, of Salisbury, State of Massachusetts, have invented an Improvement in Jump-Seat Carriages, of which the following is a specification.

This invention relates to carriages provided with a front and rear seat, and which are so constructed and arranged that the front seat may be turned or folded down, and the rear seat moved forward when but one seat is required; and it consists in the construction and combination of the divers devices embodied therein, as hereinafter more particularly and fully set forth and claimed.

Figure 1:
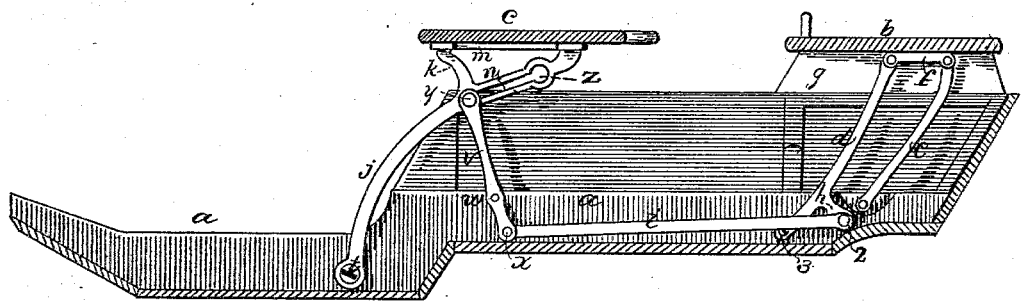
Figure 2:
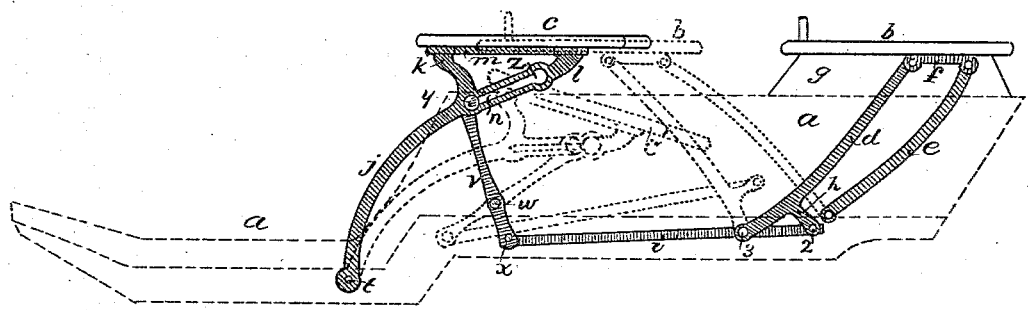

In the accompanying drawings, Figure 1 is a longitudinal vertical section through a carriage-body and seats, provided with my invention, which latter is shown in elevation as attached to the body and seats on the right-hand or "off" side thereof, the seats being shown both in position for use. Fig. 2 shows my seat supporting and jumping irons in elevation from the same stand-point as in Fig. 1, but as applied to the left-hand or "near" side of the body and seats, which latter are shown in solid lines in position for use, while the body is shown in dotted lines, and the seats are also shown in dotted lines when the front seat is turned down and the rear seat jumped forward to serve as the single seat.

The more essential features of a jump-seat attachment are that the seats be so connected that the jumping of the rear seat shall manipulate the front seat; that when both seats are in position for use the jumping and supporting irons shall so lock the seats in position that neither can be tipped backward from any cause; that when the rear seat is jumped forward it cannot be turned over from any cause; that the jumping and supporting irons shall be simple in construction, certain in operation, inexpensive, durable, and so positioned as not to interfere with free ingress to or egress from the vehicle or the comfort of passengers therein. These several results I accomplish by the devices shown in the accompanying drawings, in which—

$a$ represents the side of the body, which may be of any desired and practicable construction. $b$ is the rear seat, and $c$ the front seat. Seat $b$ is pivotally connected with body $a$ by the jumping-irons $d$ $e$, which at their lower ends are pivoted to the body and at their upper ends to socket-bar $f$, which is rigidly secured to the seat. An arm or member, $h$, extends from iron $d$, and is pivotally connected with rod $i$. Seat $c$ is supported upon standard $j$, which is pivoted to the body at $t$, and is preferably formed with the forks or arms $k$ $l$, united by plate $m$, by which it is securely attached to the seat. A bar, $v$, is pivoted to the body at $w$, and is pivoted to rod $i$ at $x$, while a wrist-pin, $y$, formed upon or secured in said bar, enters and moves freely in slot $n$ of arm $l$ of standard $j$. When seat $b$ is jumped forward, rod $i$ is moved forward by iron $d$, thereby vibrating bar $v$ on pivot $w$, and so turning seat $c$ down by the action of wrist-pin $y$ in slot $n$, and when seat $b$ is jumped back a reverse movement takes place, by which seat $c$ is raised and locked in position.

In order that wrist-pin $y$ and the enlarged button-like head or flange thereof may be formed, either by casting or forging, as an integral part of bar $v$, I form at one end of slot $n$ an enlargement, $z$, of a size and form to freely admit wrist-pin $y$, as formed with such head, while the slot proper is only of a size to admit a free movement of the wrist-pin when inserted therein; and to prevent the disengagement of bar $v$ from standard $j$ when in use, I form said slot of a length greater than the movement of bar $v$ and its wrist-pin when the seats are jumped; and as said wrist-pin is at the front end of said slot when both seats are in position for use, therefore it cannot reach enlargement $z$ when the rear seat is jumped forward, and hence cannot be displaced by the act of jumping the seats; but it may be readily disconnected from said slot, if desired, by merely disconnecting bar $v$ from its pivot $w$ and rod $i$, when the bar can be so moved as to bring the wrist-pin into said enlargement.

When seat $b$ is in either a front or rear position its base $g$ rests upon the upper edge of body $a$, and is held securely from overturning by said base and the irons $d$ $e$, and when seat $c$ is raised it is firmly supported by standard $j$ and bar $v$, which is rigidly held from vibration by jumping-iron $d$ through connecting-rod $i$.

The pivot 2 of arm $h$ and rod $i$, pivot 3 of iron $d$, and pivot $x$ of rod $i$ and bar $v$ should be in the same line, and the curvature of standard *j* and the line of slot *n* should be such as to allow seat *c* to fall below seat *b* and to rise to the required height—a matter which any person of ordinary skill in the art can readily determine. Jumping-iron *e* only serves to hold seat *b* level when it is being jumped.

I am aware that it is common to pivotally connect both front and rear seats with the body by a pair of jumping-irons *d e*, and also that it is common to connect a front seat with the body by a standard, *j*, pivoted to the body and rigidly secured to the seat; and I am also aware that it is both old and common to connect the jumping-irons of the rear seat with the pivotal supporting-irons of the front seat, whereby the front seat will be raised or lowered as the rear seat is jumped forward or back. Hence I claim none of these devices broadly; but What I do claim is—

1. The combination of jumping-iron *d*, having extension *h*, standard *j*, bar *v*, arranged to be pivoted at *w*, and to connect with and actuate said standard, and connecting-rod *i*, pivoted to arm *h* and to bar *v* below its pivot *w*, substantially as specified.

2. Pivotal standard *j*, formed to support seat *c*, and having slotted arm *l*, bar *v*, pivoted at *w*, and connected with arm *l* by its slot *n*, and rod *i*, pivoted to said bar below pivot *w*, and connected with and arranged to be actuated by the jumping-irons of seat *b*, substantially as specified.

3. The combination of jumping-iron *d*, having extension *h*, connecting-rod *i*, rigid bar *v*, having its fulcrum at *w*, and connected with and actuated by said rod, and pivotal standard *j*, having slotted arm *l*, and connected with and arranged to be raised and depressed by said bar, substantially as specified.

4. The combination of pivotal standard *j*, bar *v*, arranged to be pivoted to body *a* at a point between its extremities, and connected with and arranged to actuate said standard, jumping-iron *d*, pivoted to said body and seat *b*, and connecting-rod *i*, pivoted to iron *d* and to bar *v* below its fulcrum *w*, whereby the jumping of seat *b* will actuate seat *c*, substantially as specified.

OSGOOD MORRILL.

Witnesses:
E. WINGATE MORSE,
NATHAN B. SARGENT.